(12) United States Patent
May

(10) Patent No.: US 9,327,572 B2
(45) Date of Patent: May 3, 2016

(54) AIR SPRING WITH A SENSOR ARRANGEMENT

(71) Applicant: STEMCO Kaiser Incorporated, Millington, MI (US)

(72) Inventor: Lutz May, Berg (DE)

(73) Assignee: STEMCO Kaiser Incorporated, Millington, MI (US)

( * ) Notice: Subject to any disclaimer, the term of this patent is extended or adjusted under 35 U.S.C. 154(b) by 16 days.

(21) Appl. No.: 14/061,874

(22) Filed: Oct. 24, 2013

(65) Prior Publication Data

US 2014/0117598 A1 May 1, 2014

(30) Foreign Application Priority Data

Oct. 29, 2012 (EP) ..................................... 12190374

(51) Int. Cl.
*B60G 11/27* (2006.01)
*B60G 17/019* (2006.01)
*B60G 17/052* (2006.01)

(52) U.S. Cl.
CPC .............. *B60G 11/27* (2013.01); *B60G 17/019* (2013.01); *B60G 17/052* (2013.01); *B60G 2202/152* (2013.01); *B60G 2204/111* (2013.01); *B60G 2206/011* (2013.01); *B60G 2400/10* (2013.01); *B60G 2401/28* (2013.01); *B60G 2401/904* (2013.01)

(58) Field of Classification Search
CPC .... F16F 9/05; F16F 9/3292; B60G 2202/152; B60G 11/27
See application file for complete search history.

(56) References Cited

U.S. PATENT DOCUMENTS

| | | | | |
|---|---|---|---|---|
| 5,859,692 | A * | 1/1999 | Ross et al. | 356/4.01 |
| 6,036,179 | A * | 3/2000 | Rensel | 267/64.11 |
| 6,223,600 | B1 * | 5/2001 | Fischer et al. | 73/629 |
| 7,267,331 | B2 * | 9/2007 | Holbrook et al. | 267/64.28 |
| 8,833,511 | B2 * | 9/2014 | Maruyama et al. | 181/207 |
| 8,915,508 | B2 * | 12/2014 | May | 280/124.157 |
| 2005/0017419 | A1 * | 1/2005 | Gleu | 267/113 |
| 2006/0267297 | A1 * | 11/2006 | Nordmeyer et al. | 280/5.515 |
| 2007/0171036 | A1 | 7/2007 | Nordmeyer et al. | 340/438 |
| 2008/0243334 | A1 * | 10/2008 | Bujak et al. | 701/37 |

FOREIGN PATENT DOCUMENTS

| | | |
|---|---|---|
| EP | 0924115 | 6/1999 |
| WO | WO03069183 | 11/2003 |
| WO | WO2006042068 | 4/2006 |

* cited by examiner

*Primary Examiner* — Vishal Sahni
(74) *Attorney, Agent, or Firm* — Perkins Coie LLP

(57) ABSTRACT

An air spring (100) for a vehicle is provided. The air spring comprises a first mounting element (110) for being fixed to a vehicle's chassis (210), a second mounting element (120) for being fixed to a movable part (220) of a vehicle being movable with respect to the chassis, a bellow (130) extending from the first mounting element to the second mounting element and including an air volume (140), and a sensor arrangement (150) being arranged within the air volume. The sensor arrangement is adapted for sensing at least one of a road condition, a vehicle condition and a pay load condition.

22 Claims, 3 Drawing Sheets

AIR SPRING WITH A SENSOR ARRANGEMENT

This application claims benefit of European Patent Application Serial No. EP 12190374.4, filed on Oct. 29, 2012. The teachings of European Patent Application EP 12190374.4 are incorporated herein by reference in their entirety.

TECHNICAL FIELD OF THE INVENTION

The invention relates to an air spring for a vehicle and to an air spring system comprising a multitude of air springs.

BACKGROUND OF THE INVENTION

When aiming for vastly improved transportation and means of transportation of people and goods (like reduced fuel consumption, improved comfort, reduced overall cost, extended product life time, etc.) the machinery that will have to achieve this (trucks, cars, aircraft, trains, ships, etc.) may increase in complexity and features.

Almost every aspect of the "machinery" may have to be tightly monitored and controlled. Constant adaptations may be required to optimize the performances and efficiency of almost every moving part while the operational conditions keep changing within a short period of time or with every motion of the means of transportation for an arbitrarily short moving distance.

SUMMARY OF THE INVENTION

It may be seen as an objective technical problem to provide an air spring with improved capabilities for supplying physical parameter measurement equipment. In particular, the physical parameter measurement equipment may be adapted for acquiring parameters like suspension height, pneumatic air pressure and temperature.

The object of the present invention is solved by the subject matter of the independent claims, wherein further embodiments are incorporated in the dependent claims and the following specification.

According to an aspect of the invention, an air spring for a vehicle with a first mounting element for being fixed to a vehicle's chassis, a second mounting element for being fixed to a movable part of a vehicle being movable with respect to the chassis, a bellow extending from the first mounting element to the second mounting element and including an air volume and a sensor arrangement being arranged within the air volume is provided, wherein the sensor arrangement is adapted for sensing at least one of a road condition, a vehicle condition and a payload condition.

The vehicle condition may in particular be a condition of the vehicle outside the air spring, for example vibrations or oscillations due to a road surface of the street the vehicle is using.

The air spring as described above and hereinafter may provide in particular a protected and secured mounting position for the sensor arrangement as it is mounted inside the air volume and thus protected against external influences such as water, dust, snow, and mechanical influences caused by uneven surfaces.

As the first mounting element is being fixed to the vehicle's chassis and the second mounting element is being fixed to a movable part, for example to a wheel suspension, being movable with respect to the chassis, vibrations and oscillations of the chassis on the one hand and of the wheel on the other hand may be detected. Thus, the status of the chassis and/or the status of the wheel and the road may be detected independently from each other.

According to an embodiment of the invention, the sensor arrangement comprises a transmitter for transmitting sensed data to an external receiving unit, wherein the transmitter operates wireless.

A wireless operating transmitting unit allows transmission of data without the necessity of providing wire bound data transmission and thus having to provide an opening or a breakthrough in the housing of the air spring for the wire. The wireless transmission of data from the transmitter to the receiver may allow a more solid and low-maintenance air spring due to the lack of an opening for a wire and thus avoiding the intrusion or penetration of dust, soil and dirt into the air volume of the air spring. In an alternative embodiment the transmitter may also operate wire bound.

According to a further embodiment of the invention, the sensor arrangement comprises a sensor in form of a first accelerometer.

The accelerometer may be adapted to acquire vibration data for determining a road surface quality, a tire pressure of the wheel to which an air spring may be assigned, a horizontal level or tilting of the vehicle, twisting or bending of the frame structure or of the chassis. Further, the data received from the accelerometer may help in order to avoid resonance frequencies of the chassis and may help to detect and to reduce vibrations and other driving noises of the vehicle as well as to determine the dampening factor effectiveness of the air spring.

According to a further embodiment of the invention, the sensor arrangement comprises a sensor in form of a second accelerometer, wherein the first accelerometer is fixedly mounted with respect to the first mounting element and the second accelerometer is fixedly mounted with respect to the second mounting element so as to allow a differential mode measurement with the first and second accelerometers.

Thus, when used within a vehicle, the first accelerometer may determine vibrations of the vehicle's chassis and the second accelerometer may determine vibrations of the wheel or the wheel suspension. This structural setup may allow in particular to determine the dampening effectiveness, as, after a sort, the first and second accelerometer determine an input vibration, i.e. the vibration of the wheel suspension caused by the surface of the road, and an output vibration, i.e. the vibration of the vehicle's chassis.

According to a further embodiment of the invention, the sensor arrangement comprises a multitude of sensors in form of accelerometers for three dimensions.

The acceleration in the first dimension may be an acceleration of a vehicle and in particular of the air spring in moving direction of the vehicle, i.e. in terms of a moving vehicle back and forth. The acceleration in the second dimension may be an acceleration perpendicular to the moving direction, i.e. in terms of a moving vehicle to the left and to the right. Thus, the first dimension and the second dimension define a planar surface of a road the vehicle is moving on. The acceleration in the third dimension may be acceleration orthogonal to the planar surface defined by the first and the second dimension, i.e. in terms of a moving vehicle, this vehicle is moving up or down on an inclined road.

All of these acceleration in any one of the dimensions may be caused by a change of direction of the vehicle as well as by an uneven surface of the road or due to loads which are not secured in a suitable manner, i.e. perform unintended movements on a loading or cargo area.

According to a further embodiment of the invention, the sensor arrangement comprises a sensor in form of a first gyroscope.

The gyroscope enables determination of change of direction of the vehicle and/or of the wheel or the wheel suspension. The gyroscope may as well detect vibrations and oscillations of the wheel suspension, i.e. of the first mounting element, and of the chassis, i.e. of the second mounting element. The gyroscope may be used additionally or optionally to the accelerometer.

According to a further embodiment of the invention, the sensor arrangement comprises a sensor in form of a second gyroscope, wherein the first gyroscope is fixedly mounted with respect to the first mounting element and the second gyroscope is fixedly mounted with respect to the second mounting element, so as to allow a differential mode measurement with the first and second gyroscopes.

The gyroscopes may be used additionally or optionally to the accelerometers and may be adapted to provide an improved measurement of the vibrations of the first mounting element and the second mounting element. The above elucidations with respect to the accelerometers apply in an analog manner to the gyroscopes.

According to a further embodiment of the invention, the sensor arrangement comprises a multitude of sensors in form of gyroscopes for three dimensions.

One or more gyroscopes may in particular be adapted for detecting and determining an acceleration, vibration, and/or change of direction of the first mounting element and/or of the second mounting element in one of the said three directions, respectively.

According to a further embodiment of the invention, the sensor arrangement comprises a sensor in form of a first microphone.

The first microphone may in particular be a body microphone and may be adapted for detecting body noise and vibration which may be used to draw conclusions to the road surface, structural diagnostics, and/or tire pressure. In case the microphone is a body noise microphone, the signal detection may not be interfered or disturbed by acoustic noise, i.e. from the surroundings of the air spring like a vehicle's motor noise or other external acoustic noise.

According to a further embodiment of the invention, the sensor arrangement comprises a sensor in form of a second microphone, wherein the first microphone is fixedly mounted with respect to the first mounting element and the second microphone is fixedly mounted with respect to the second mounting element, so as to allow a differential mode measurement with the first and second microphones.

The explanations given above regarding the first and second accelerometers and gyroscopes apply in a similar manner to the first and second microphones, which allow a measurement of noise in a wheel suspension and a vehicle's chassis, for example.

According to a further embodiment of the invention, the air spring comprises a wireless power supply being adapted for wireless transfer of power from the outside of the air volume to the inside of the air volume.

Similar to the transmission of data from the transmitter being arranged within the air volume to the receiving unit arranged outside the air volume, the wireless power supply avoids providing openings in the air spring in order to lead through wires or lines for the power supply such that the air spring provides a closed air volume with a reduced number of openings such that the danger of being intruded with dust or dirt is reduced.

The wireless power supply may base on the principle of induction, i.e. the energy is generated when a moving part of the power supply is moved along a static part, such that the energy is generated by the said motion. The moving part may be mechanically attached to the second mounting element such that the motion of the second mounting element moves the moving part with respect to the static part and the needed energy is generated. This process may in particular be kept running when a vehicle with the air spring as described above and hereinafter moves on.

Likewise, energy may be transmitted via microwaves from the outside to the inside of the air volume.

According to a further embodiment of the invention, at least one of the first and second mounting element has a mounting opening and a sensor arrangement carrier, wherein the sensor arrangement carrier has a sensor mounting portion and an outside portion, wherein the sensor mounting portion and the outside portion are separated by a seal line corresponding to the mounting opening, so that a sensor may be mounted and dismounted within the air volume.

The sensor arrangement carrier may be adapted to be used for opening and closing the air volume when being taken from the mounting opening and being fitted into the mounting opening, respectively. Thus, the sensor arrangement carrier performs the task of carrying the sensor arrangement and closing the air volume. When being taken from the mounting opening, the sensor arrangement is taken out of the air volume at the same time and is accessible in an easy manner for maintenance, for example.

The seal line may be a rubber lip adapted for sealing the air volume in a mounted state of the sensor arrangement carrier such that intrusion of dust, dirt, or the like is reduced or avoided.

According to a further aspect of the invention, an air spring system, and in particular an air spring system for a vehicle, and in particular for a land vehicle with an air spring as described above and hereinafter and a control unit is provided, wherein the control unit is adapted for receiving sensed signals from the sensor arrangement of the air spring and wherein the control unit is adapted to evaluate the sensed signals upon at least one of a road condition, a vehicle condition and a pay load condition.

Each of the air springs of the air spring system may be adapted to damp the vibrations of one wheel or wheel suspension of a vehicle. The control unit accumulates or joins the sensor signals of all of the air springs and is thus able to provide an overview of the vehicle's status. In particular, the load or stress and the dampening effectiveness of each of the air springs may be detected in order to obtain an overall status of the vehicle's air spring system.

According to an embodiment of the invention, the control unit is adapted for conducting a signal profile analysis based on the sensed signals and correlations thereof.

The sensed signals and correlations thereof may in particular be compared with known profiles as to identify and recognize the current signal profile. Such known profiles may be profiles of inappropriately attached load or inadequately inflated tires, for example.

According to a further embodiment of the invention, the air spring system comprises a plurality of air springs, wherein the control unit is adapted for conducting a signal profile analysis based on sensed signals from each air spring of the plurality of air springs.

In a similar manner as for one air spring, the signal profile analysis may be carried out for the signals of a multitude of air springs and the according signals as well as comparing the measured signal profiles with known and prior recorded signal profiles.

It should be noted that the invention is not limited to the use of accelerometers, gyroscopes, and microphones. In one embodiment, any kind of physical parameter sensor may be located inside of an air spring's air volume, for example earth magnetic field sensors, mechanical shock sensors, temperature sensors, and all other acceleration, vibration and motion sensors.

The output signals of these sensors may be provided to the control unit or to any other kind of evaluation unit in an untreated, analogue format or in a processed format, including using means for digital signal processing.

These and other aspects of the present invention will become apparent from and elucidated with reference to the embodiments described hereinafter.

DETAILED DESCRIPTION OF THE INVENTION

Figure 1:
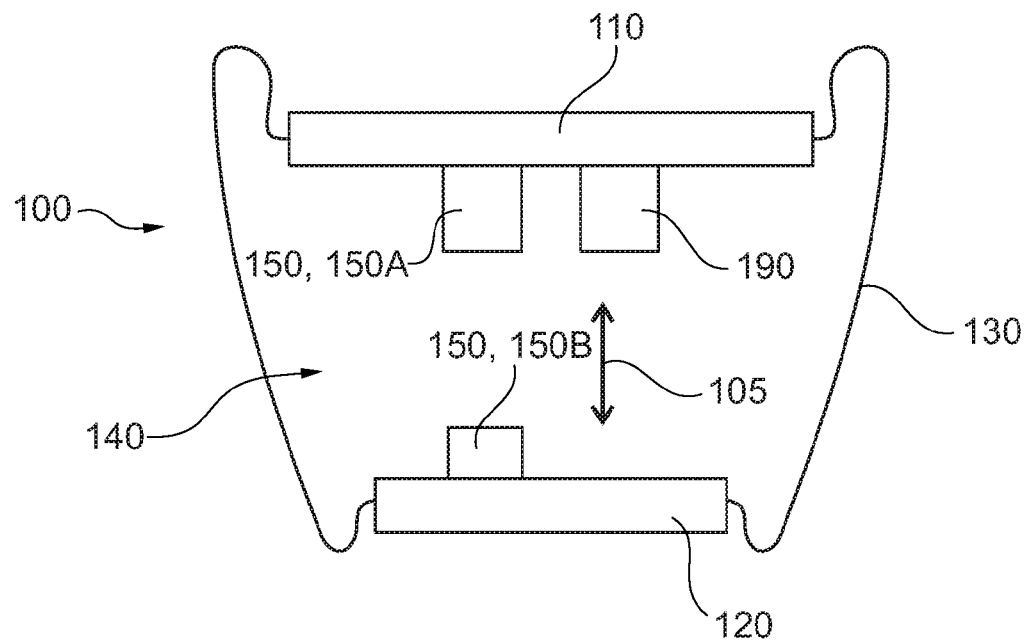
FIG. 1 illustrates an air spring according to an exemplary embodiment of the invention.

FIG. 1 illustrates an air spring 100 with a first mounting element 110, a second mounting element 120, and a bellow 130. The first mounting element in form of a top plate, the second mounting element in form of a bottom plate, and the bellow contain or include a volume and in particular the air volume 140.

In an operating mode of the air spring, the top plate and the bottom plate may move towards each other along the direction arrow 105 by movements of the bottom plate and/or by movements of the top plate.

Inside of the air spring, i.e. within the air volume 140, a sensor arrangement 150 is located such that a first sensor arrangement unit 150A is arranged at the first mounting element 110 and a second sensor arrangement unit 150B is arranged at the second mounting element 120. Both sensor arrangement units may be functionally linked to each other, i.e. electrically interconnected and/or share a common data transmission channel for transmitting and/or receiving signals, data, and information from and to each other, respectively.

The first sensor arrangement unit 150A is adapted for measuring vibrations, oscillations, and/or accelerations of the first mounting element, i.e. of the top plate, wherein the second sensor arrangement unit 150B is adapted for measuring vibrations, oscillations, and/or accelerations of the second mounting element, i.e. the bottom plate. As both sensor arrangement units 150A, 150B are located inside the air volume 140 of the air spring 100 and transmit the measured physical parameters wireless to a receiver (not shown in FIG. 1) located outside of the air volume, no wire-bound connection may be led from the air volume outside of the air spring. Thus, no additional openings for such wires may be required and the air volume is protected against intrusion of dust, water, and other dirt particles.

It should be noted, that the sensor arrangement may comprise a single sensor arrangement unit mounted to the first mounting element or the second mounting element as well as a multitude of sensor arrangement units, of which a plurality of sensor arrangement units may be mounted to each one of the first mounting element and the second mounting element.

Inside of the air volume 140, a wireless power supply 190 is arranged at the first mounting element for providing electrical energy to the sensor arrangement 150. The wireless power supply 190 may in particular be an energy receiver for receiving energy transmitted via microwaves or may base on the principle of induction, wherein the energy is generated by the movements of the power supply 190 and/or by the movements of the first mounting element.

Alternatively, the power supply may be mounted to the second mounting element as well as more than one power supply units may be used. Further, an induction loop may be arranged at an inner surface or at an outer surface of the bellow 130.

Figure 2:
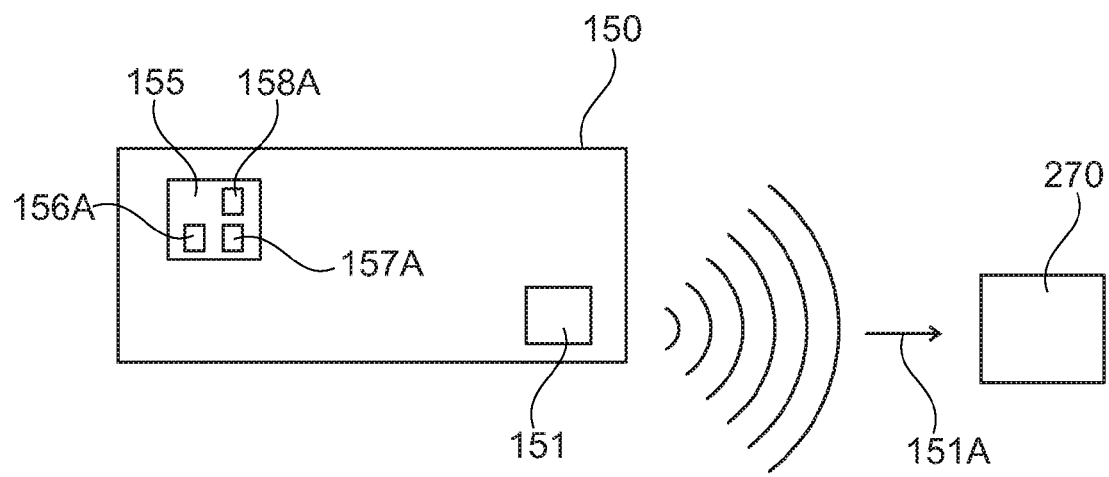
FIG. 2 illustrates a sensor arrangement for an air spring according to an exemplary embodiment of the invention.

FIG. 2 illustrates a sensor arrangement 150, and in particular a sensor arrangement unit, comprising a sensor 155 with a first accelerometer 156A, a first gyroscope 157A, and a first microphone 158A, each adapted for measuring physical parameters as described above and hereinafter. The sensor arrangement further comprises a transmitter 151 for transmitting data, i.e. the signals corresponding to the measured physical parameters, to a receiver 270, which may in particular be located outside of the air volume 140 of the air spring 100. The signal transmission is carried out wireless, which is indicated by arrow 151A.

The sensor arrangement 150 may comprise any one of the sensor types named above and hereinafter additionally or optionally to the first accelerometer 156A, the first gyroscope 157A, and the first microphone 158A shown in FIG. 2.

Figure 3:
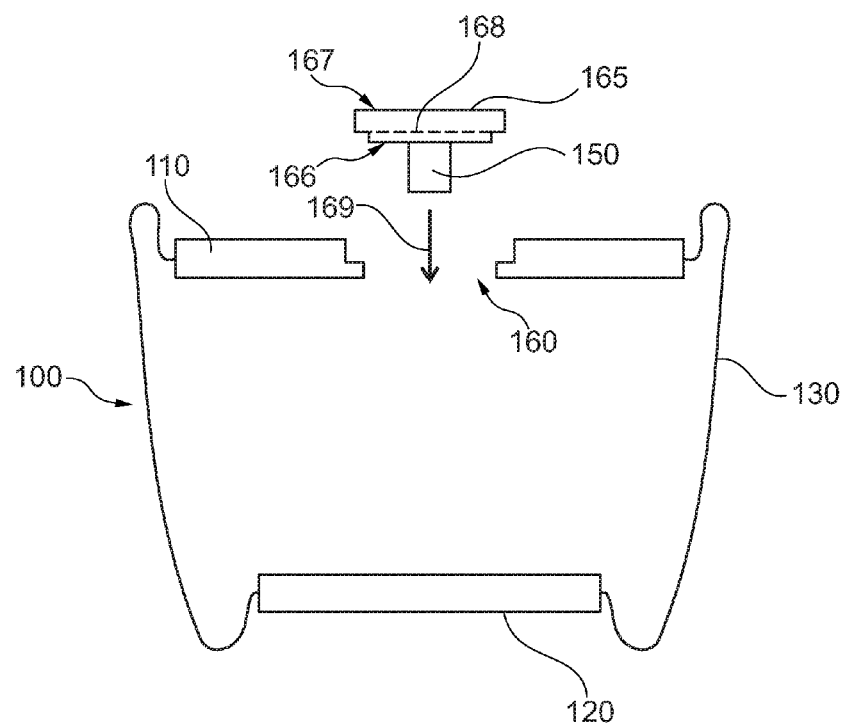
FIG. 3 illustrates an air spring according to an exemplary embodiment of the invention.

FIG. 3 illustrates another exemplary embodiment of the air spring, wherein the first mounting element 110 comprises a mounting opening 160 for providing access to the air volume in case mounting steps and/or repairing steps have to be carried out. A sensor arrangement carrier 165 is provided for covering and uncovering the mounting opening 160, i.e. to close or open the air volume 140, respectively. In order to bring the sensor arrangement carrier 165 from an uncovering state to a covering state of the mounting opening 160, the sensor arrangement carrier is to be moved towards the arrow 169.

The sensor arrangement carrier 165 comprises a sensor mounting portion 166 and an outside portion 167, wherein the sensor mounting portion 166 comprises a surface of the sensor arrangement carrier 165 directed towards the air volume 140 in the covering state, and wherein the outside portion comprises a surface of the sensor arrangement carrier 165 directed opposite to the air volume in the covering state.

Further, the sensor arrangement carrier 165 comprises a seal line 168 which is adapted to seal the air volume against intrusion of particles from the surroundings of the air springs, i.e. to tightly close the air volume in the covering state of the sensor arrangement carrier. The seal line may in particular be a rubber lip and/or may comprise other plastically and/or elastically malleable materials.

A sensor arrangement 150 is mounted to the sensor mounting portion 166. Thus, when moving the sensor arrangement carrier 165 from the covering state to the uncovering state, a direct access to the sensor arrangement 150 for maintenance purposes is possible without the requirement to work inside the air volume. However, an access to the inside of the air volume is also possible through the mounting opening, in case a further sensor arrangement unit may be arranged at the second mounting portion.

Figure 4:
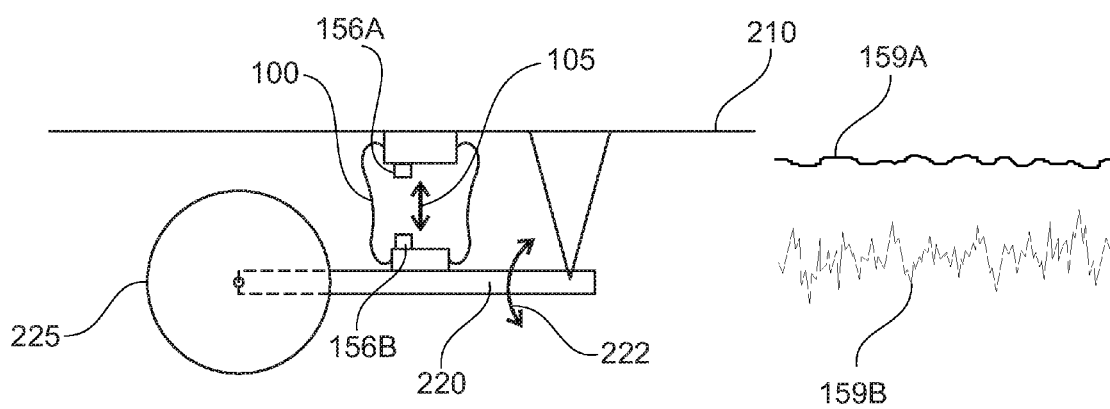
FIG. 4 illustrates a wheel suspension with an air spring according to an exemplary embodiment of the invention.

FIG. 4 illustrates a wheel suspension 220 and a vehicle's chassis 210, which are mechanically linked to each other and have an air spring 100 for dampening vibrations of the wheel 225 due to uneven road condition, wherein one of the mounting elements of the air spring is mounted to the wheel suspension 220 and the other one of the mounting elements of the air spring is mounted to the vehicle's chassis 210.

The wheel suspension 220 may move along the arrow 222 when the road rolls over an uneven street and, as a result of the vibrations of the wheel 225 and of the wheel suspension 220, the mounting elements of the air spring are moving frequently towards and away from each other like indicated by arrow 105. The air spring and in particular the air volume within the air spring is adapted to dampen the vibrations of both the wheel suspension and the vehicle's chassis as to not transfer or transmit these vibrations from one of these parts to the other one, respectively.

The vibrations of the wheel suspension 220 are detected by the second accelerometer 156B which is mounted to the bottom plate of the air spring and the vibrations of the vehicle's chassis 210 are detected by the first accelerometer 156A which is mounted to the top plate of the air spring.

Accordingly, the detected signals of the physical parameter acceleration measured by the first and second accelerometers 156A, 156B are indicated by the signal patterns 159A and 159B. The signal pattern 159B belongs to the second accelerometer 156B which is mechanically attached via the bottom plate to the wheel suspension 220 and thus subjected to vibrations caused by an uneven road, for example. The signal pattern 159A belongs to the first accelerometer 156A which is mechanically attached via the top plate to the vehicle's chassis 210 and thus subjected to vibrations of the chassis which are damped or muffled by the air spring.

The signal pattern 159A is smoothed and damped with respect to the signal pattern 159B. In other words, the signal pattern 159B may be considered as an input signal which is to be damped by the air spring and the signal pattern 159A may be considered as an output signal transmitted to the vehicle's chassis and caused by the input signal 159B.

Figure 5:
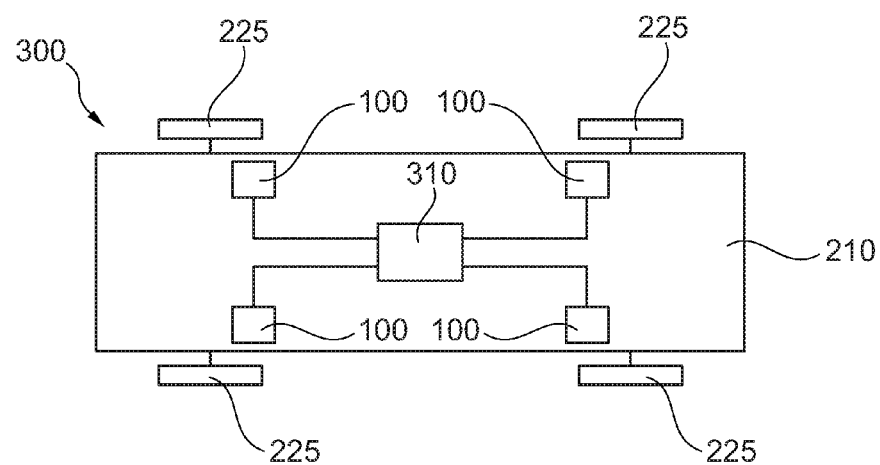
FIG. 5 illustrates an air spring system according to an exemplary embodiment of the invention.

FIG. 5 illustrates an air spring system 300, comprising four air springs 100 which transmit the data measured by the sensor arrangement of each of the air springs to a control unit 310. The shown link between the air springs and the control unit 310 is a data link which may be either wire-bound or wireless. The data link may also be directed from the sensor arrangement of the air springs directly to the control unit, as well as first transmitted from the sensor arrangement to a receiving unit as shown in FIG. 2 which then transmits the data to the control unit.

The air spring system 300 may be mounted in a vehicle such that at least one air spring is assigned to one wheel or one wheel suspension. FIG. 5 illustrates this principle with a four-wheeled vehicle. It should be understood that the air spring system as described above and hereinafter may comprise more or less than four air springs and may also be used in vehicles comprising more or less than four wheels or wheel suspensions.

Figures 6A, 6B, 6C:
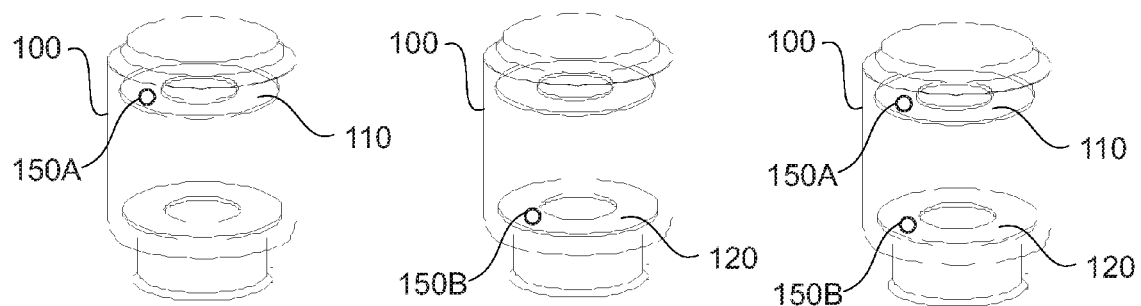
FIG. 6A illustrates an air spring according to an exemplary embodiment of the invention.
FIG. 6B illustrates an air spring according to an exemplary embodiment of the invention.
FIG. 6C illustrates an air spring according to an exemplary embodiment of the invention.

FIGS. 6A, 6B, and 6C illustrate the possible locations of a sensor arrangement, wherein both the first and second mounting elements 110, 120 are ring-shaped plates within the air volume of the air spring.

According to FIG. 6A, a first sensor arrangement unit 150A, for example in form of an accelerometer, is located on the first mounting element 110 which is a ring-shaped top plate within the air spring. The first mounting element may be adapted for being attached close to a vehicle's chassis such that a location of the first sensor arrangement unit close to the chassis may enable measurement of a resonance frequency of the vehicle's chassis and measurements due to leveling settings of the vehicle.

According to FIG. 6B, a second sensor arrangement unit 150B, for example in form of an accelerometer, is located on the second mounting element 120. The second mounting element may be adapted for being attached to a wheel suspension such that the location of the second sensor arrangement unit close to the wheel suspension may enable road surface analysis and system diagnosis.

According to FIG. 6C, a first sensor arrangement unit 150A and a second sensor arrangement unit 150B, for example each in form of an accelerometer, are located on the first mounting element and the second mounting element, respectively. When operated separate from each other, i.e. each sensor arrangement unit individually, the sensor arrangement units may be operated as described in connection with FIGS. 6A, 6B. Furthermore, when comparing the measured signals from the sensor arrangement units, a differential mode measurement may be enabled.

In particular, the first sensor arrangement unit 150A and the second sensor arrangement unit 150B may be arranged such that the move directly towards each other in case the bottom plate moves towards the top plate, i.e. the sensor arrangement units 150A, 150B have a common moving axis parallel to the moving direction of the top plate and the bottom plate in an operating state of the air spring. In other words, in one exemplary embodiment the first and the second sensor arrangement unit may not have any lateral displacement or misalignment, i.e. the first sensor arrangement and the second sensor arrangement are with respect to the moving direction of the top and bottom plate above/below each other.

The sensor arrangement may be placed either at a top of the air spring or at the bottom. When differential signal measurements are required or signal comparisons then the sensor arrangement may be placed at both the top and the bottom (like when calculating the damping factor or when trying to reduce vehicle vibrations caused by the combinations of the effects from the road surface, vehicle speed, and tire pressure, for example).

The wheel of a vehicle is mechanically connected to the bottom part of an air spring. The frame-work of the vehicle's chassis is resting at the top of the air spring unit. In this specific example two accelerometer sensor units are mounted in the top (Ay) and bottom part (By) of the Air-Spring unit mechanics. When the vehicle is rolling over a road covered with gravel, then a certain type of "vibration"-noise signal will be generated by the Accelerometer By. The vibration type of signal is mainly caused by the uneven road (road is not smooth). The accelerometer sensor Ay that is mounted near to the vehicle's chassis structure (in the top part of the air spring) will be muffled and dampened in comparison to the signal from By. Of course, in a standard suspension system a shock absorber is used as well, but is not discussed here any further. Driving over a smooth road surface will result in a far less noisy signal. Each of the two signals can be analyzed on its own (By, and Ay), or they can be compared to each other (building the differential-signal) depending on the objective of the signal analysis.

The information required to make definite and reliable statements about the measured physical parameters may be measured either directly (like the absolute axle tilting of the vehicle), indirectly through data-comparison (like the bending of the trailer main platform: differential signal by comparing the values of at least two gyroscopes placed at two different locations on the vehicle), or by advances signal analysis (like when determine the tire air pressure or the axle bearing performance: signal profile and signal frequency spectrum).

The air spring as described above and hereinafter may integrate a specific sensor array, i.e. sensor arrangement, onto already existing electronics of an air spring solution and may use an on-board computer for the processing of the signals from this sensor array.

The sensor arrangement may be placed at the most ideal location for the intended measurement: where the forces coming from the wheels and the axles act onto the main-system-frame (chassis, for example). The fast amount of additional measurement information will then be made available through one-and-the-same electrical connector that an air spring unit may already have or which is to be provided. The sensor arrangement may not require an additional housing and protection from the environment as it is placed onto an electronics board within the air volume of the air spring.

Depending on the physical parameters that have to be detected and measured and depending on the targeted signal quality, a number of different sensor types may be installed into the structure of the air spring. The minimum of recommended sensors to install may be 2 (accelerometers) at the top and bottom of the Air-Spring unit, respectively, and the advisable maximum number of sensors may be 12.

The possible combination of the sensor arrangement that may be installed in one air spring may be relatively high (>40). Some types of sensors may be categorized as "optional", like a temperature sensor, an air pressure sensor, and a microphone. For an overview of the exemplary sensors, Table 1 is provided. These sensors may be placed elsewhere in a vehicle and may not have to be placed in or near the air spring. However, in case the air spring has already an electronic data acquisition system and a digital-serial bus interface included, it may be reasonable to add these "optional" sensors.

In most simple terms, the sensor arrangement or sensor arrays as described above and hereinafter, may be placed and mounted inside of the mechanics of the air spring, and can be placed and mounted from the outside of the air spring. The sensor arrangement has to be firmly attached to the mechanical structure of the air spring (the bottom piston or/and the top plate, also called the upper bit). The term "firmly" attached means that a good mechanical signal transfer has to be achieved as otherwise the electrical output signal from the sensor will be distorted, damped, and of poor quality. When mounting the sensors inside the air spring, i.e. within the air volume, the sensor arrangement cannot be seen from the outside, may be better protected from the environments (water, dust, and stones, others . . . ). In reverse, when mounting the sensor arrangement from the outside of the air volume, then they can be retro fitted, can be more easily maintained, repaired and serviced.

A signal processing stage for improving the signal quality may include the following features: automatic compensation of unwanted effects caused by changes of the environmental operating conditions, like temperature and supply voltage; signal filtering stages to improve the signal-to-noise ratio which may be built using discrete passive and/or active components, using advanced analogue filter ICs, programmable digital filter IC, or software operated digital filter systems (using a microprocessor, for example); customisation of the signal output format (analogue, serial digital, . . . ), wherein typical serial-digital signal interfaces may be formats like RS232, RS485, CAN, Lin Bus, Basic CAN; advanced methods to reduce or even to eliminate the unwanted effects of electro-magnetic interferences (often called: EMI), which may include also certain types of differential mode signal processing, frequency hopping, and plausibility signal analysis; signal frequency spectrum analyser functions when aiming to provide a signal-profile analysis (for diagnostic purposes, for example). Most likely, an advanced signal processing function may require the use of a micro-controller (for example in the form of a single chip RISC processor, or a low cost DSP).

TABLE 1

| Sensor Device | Measurement Orientation and Purpose | Explanations | Importance/ Priority | Number of sensors that could be used |
|---|---|---|---|---|
| Accelerometer X axis | Measuring in driving direction (horizontal) | Accelerating and decelerating forces | 3 | 1 |
| Accelerometer Y axis | Measuring in vertical direction | Vibrations caused by road surface, Tire Pressure, Diagnostics, Resonances | 1 | 2-differential mode |
| Accelerometer Z axis | Measuring in left-right direction (horizontal) | Centrifugal forces/ curves | 2 | 1 |
| Gyro X Axis | Measuring in driving direction (horizontal) | Allows vector calculations | 3 | 1 |
| Gyro Y Axis | Measuring in vertical direction | Vehicle leveling/tilting in two axis/structural warping | 2 | 2-differential mode |
| Gyro Z Axis | Measuring in left-right direction (horizontal) | Allows vector calculations | 3 | 1 |
| Microphone | Measuring body noise/vibration | Road Surface, Structural Diagnostics, Tire pressure | Optional/Cost reduction | 1 |
| Temperature (outside) | Air Temperature | Assists in calculating Air Pressure, Diagnostics | Optional | 1 |
| Temperature (inside) | Compressed Air | Assists in calculating Air | Optional | 1 |

TABLE 1-continued

| Sensor Device | Measurement Orientation and Purpose | Explanations | Importance/ Priority | Number of sensors that could be used |
|---|---|---|---|---|
| Pressure | Temperature Compressed Air Pressure | Pressure, Diagnostics | Optional | 1 |
| | Advisable Max number of sensors per Air-Spring | | | 1 |

LIST OF REFERENCE NUMERALS USED IN THE DRAWINGS 100 air spring
105 suspension direction
110 first mounting element
120 second mounting element
130 bellow
140 air volume
150 sensor arrangement
150A first sensor arrangement unit
150B second sensor arrangement unit
151 transmitter
151A wireless transmission path
155 sensor
156A first accelerometer
156B second accelerometer
157A first gyroscope
157B second gyroscope
158A first microphone
158B second microphone
159A first signal pattern
159B second signal pattern
160 mounting opening
165 sensor arrangement carrier
166 sensor mounting portion
167 outside portion
168 seal line
169 mounting direction
190 wireless power supply
210 vehicle's chassis
220 movable part of the vehicle's chassis, wheel suspension
222 moving direction
225 wheel
300 air spring system
310 control system This application claims benefit of European Patent Application Serial No. EP 12190374, filed on Oct. 29, 2012. While certain representative embodiments and details have been shown for the purpose of illustrating the subject invention, it will be apparent to those skilled in this art that various changes and modifications can be made therein without departing from the scope of the subject invention.

What is claimed is:

1. An air spring system comprising:
a first mounting element adapted for being fixed to a chassis of a vehicle;
a second mounting element adapted for being fixed to a movable part of the vehicle, wherein said movable part is movable with respect to the chassis of the vehicle;
a bellows extending from the first mounting element to the second mounting element, wherein the bellows includes an air volume;
a sensor arrangement, wherein the sensor arrangement is contained within the air volume, and wherein the sensor arrangement is adapted to detect at least one sensed data relating to a road condition, a vehicle condition and/or a pay load condition; and
a control unit, wherein the control unit is adapted for receiving sensed signals from the sensor arrangement of the air spring, wherein the sensor arrangement is arranged within the air spring, wherein the control unit is adapted to evaluate the sensed signals upon at least one of the road condition, the vehicle condition and the pay load condition, wherein the control unit is adapted for conducting a signal profile analysis based on the sensed signals and correlations thereof, and wherein the control unit is adapted for comparing the sensed signals and correlations thereof with known signal profiles as to identify and recognize a current signal profile.

2. The air spring system according to claim 1 wherein the sensor arrangement comprises a transmitter for transmitting the sensed data to an external receiving unit.

3. The air spring system according to claim 2 wherein the transmitter operates wirelessly.

4. The air spring system according to claim 1 wherein the sensor arrangement comprises a sensor in a form of a first accelerometer.

5. The air spring system according to claim 4 wherein the sensor arrangement is further comprised of a second accelerometer.

6. The air spring system according to claim 5 wherein the first accelerometer is fixedly mounted with respect to the first mounting element and the second accelerometer is fixedly mounted with respect to the second mounting element.

7. The air spring system according to claim 6 wherein the first accelerometer and the second accelerometer are mounted so as to allow a differential mode measurement with respect to the first accelerometer and the second accelerometer.

8. The air spring system according to claim 1 wherein the sensor arrangement comprises a multitude of accelerometers which detect acceleration in three dimensions.

9. The air spring system according to claim 1 wherein the sensor arrangement comprises a sensor in a form of a first gyroscope.

10. The air spring system according to claim 9 wherein the sensor arrangement is further comprised of a second gyroscope.

11. The air spring system according to claim 10 wherein the first gyroscope is fixedly mounted with respect to the first mounting element and the second gyroscope is fixedly mounted with respect to the second mounting element.

12. The air spring system according to claim 11 wherein the first gyroscope and the second gyroscope are mounted so as to allow a differential mode measurement with respect to the first gyroscope and the second gyroscope.

13. The air spring system according to claim 1 wherein the sensor arrangement comprises a multitude of gyroscopes which detect changes in direction in three dimensions.

14. The air spring system according to claim 1 wherein the sensor arrangement comprises a sensor in a form of a first microphone.

15. An air spring system according to claim 14 wherein the sensor arrangement is further comprised of a second microphone, wherein the first microphone is fixedly mounted with respect to the first mounting element and the second microphone is fixedly mounted with respect to the second mounting element, and wherein the first microphone and the second microphone are mounted so as to allow a differential mode measurement with respect to the first microphone and the second microphone.

16. The air spring system according to claim 1 wherein the air spring system comprises a plurality of air springs, and wherein the control unit is adapted for conducting a signal profile analysis based on sensed signals from each air spring of the plurality of air springs.

17. The air spring system of claim 1, further comprising a wireless power supply adapted for wireless transfer of power from outside of the air volume to inside of the air volume, wherein the wireless power supply provides power to the sensor arrangement.

18. The air spring system of claim 1, wherein the sensor arrangement includes a first sensor coupled to the first mounting element and a second sensor coupled to the second mounting element, wherein conducting the signal profile includes comparing a measurement from the first sensor with a measurement from the second sensor.

19. An air spring system comprising:
- a first mounting element adapted for being fixed to a chassis of a vehicle;
- a second mounting element adapted for being fixed to a movable part of the vehicle, wherein the movable part is movable with respect to the chassis of the vehicle;
- a bellows extending from the first mounting element to the second mounting element, wherein the bellows includes an air volume;
- a sensor arrangement; and
- a control unit adapted for:
  - receiving sensed signals from the sensor arrangement,
  - evaluating the sensed signals upon at least one of a road condition, a vehicle condition, and a pay load condition,
  - conducting a signal profile analysis based on the sensed signals and correlations thereof, and
  - comparing the sensed signals and the correlations thereof with known signal profiles to identify and recognize a current signal profile.

20. An air spring system comprising:
- a first mounting element which is adapted for being fixed to a chassis of a vehicle;
- a second mounting element adapted for being fixed to a movable part of the vehicle, wherein said movable part is movable with respect to the chassis of the vehicle;
- a bellows extending from the first mounting element to the second mounting element, wherein the bellows includes an air volume;
- a sensor arrangement coupled to the air spring in the air volume defined by the bellows, wherein the sensor arrangement comprises a plurality of sensors;
- a control unit, wherein the control unit is adapted for:
  - receiving sensed signals from the sensor arrangement,
  - evaluating the sensed signals upon at least one of a road condition, a vehicle condition, and a pay load condition,
  - conducting a signal profile analysis based on the sensed signals and correlations thereof, and
  - comparing the sensed signals and the correlations thereof with known signal profiles to identify and recognize a current signal profile; and
- a wireless power supply adapted for wireless transfer of power from outside of the air volume to inside of the air volume, wherein the wireless power supply provides power to the sensor arrangement.

21. The air spring system of claim 20 wherein the plurality of sensors comprises at least two different types of sensors.

22. The air spring system of claim 21 wherein the at least two different types of sensors are selected from the group consisting of: a gyroscope, a microphone, temperature sensor, air pressure sensor, and an accelerometer.

* * * * *